Figure 1:
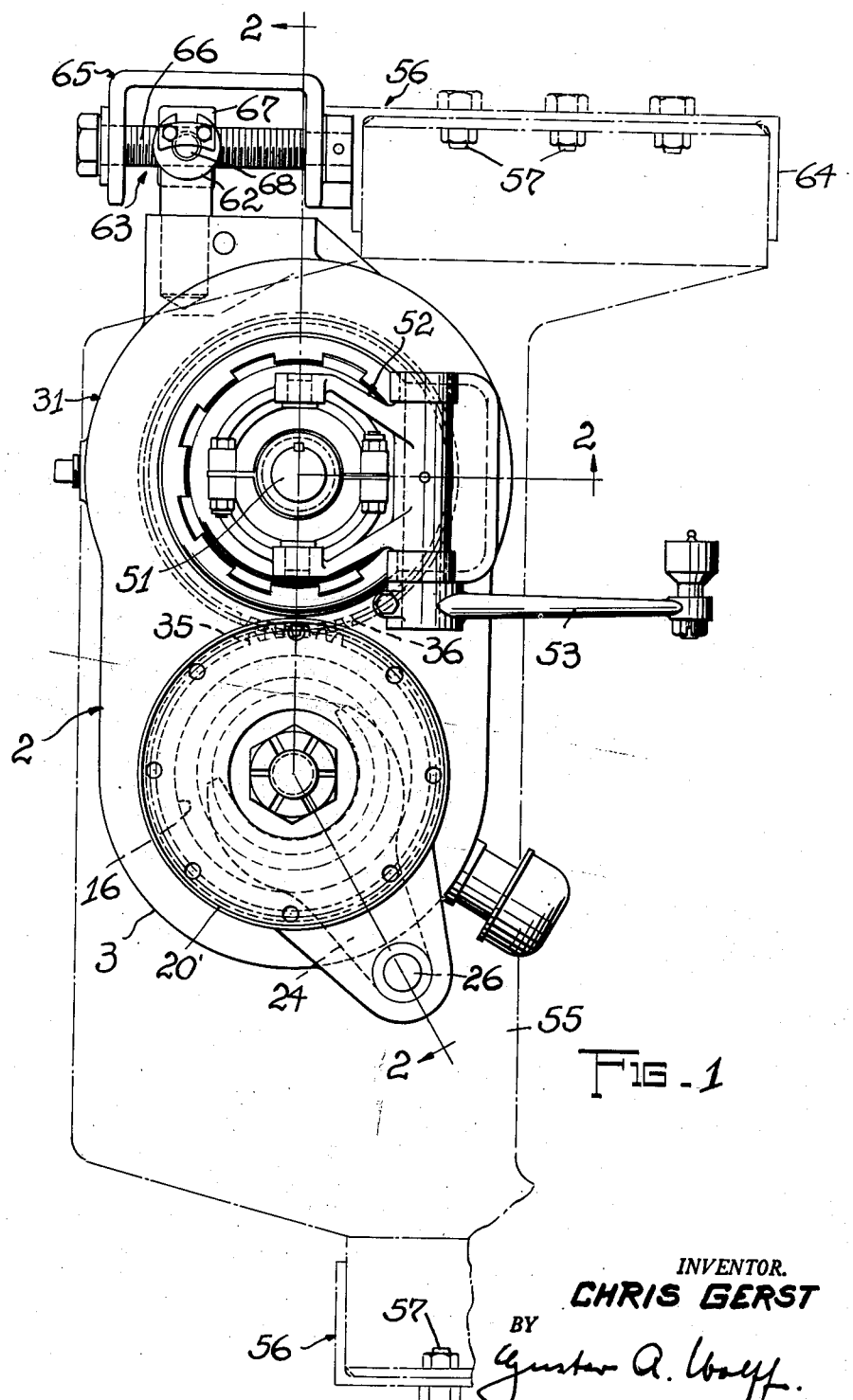

June 10, 1952  C. GERST  2,600,108
POWER TAKEOFF
Filed Jan. 12, 1950  2 SHEETS—SHEET 1

INVENTOR.
CHRIS GERST

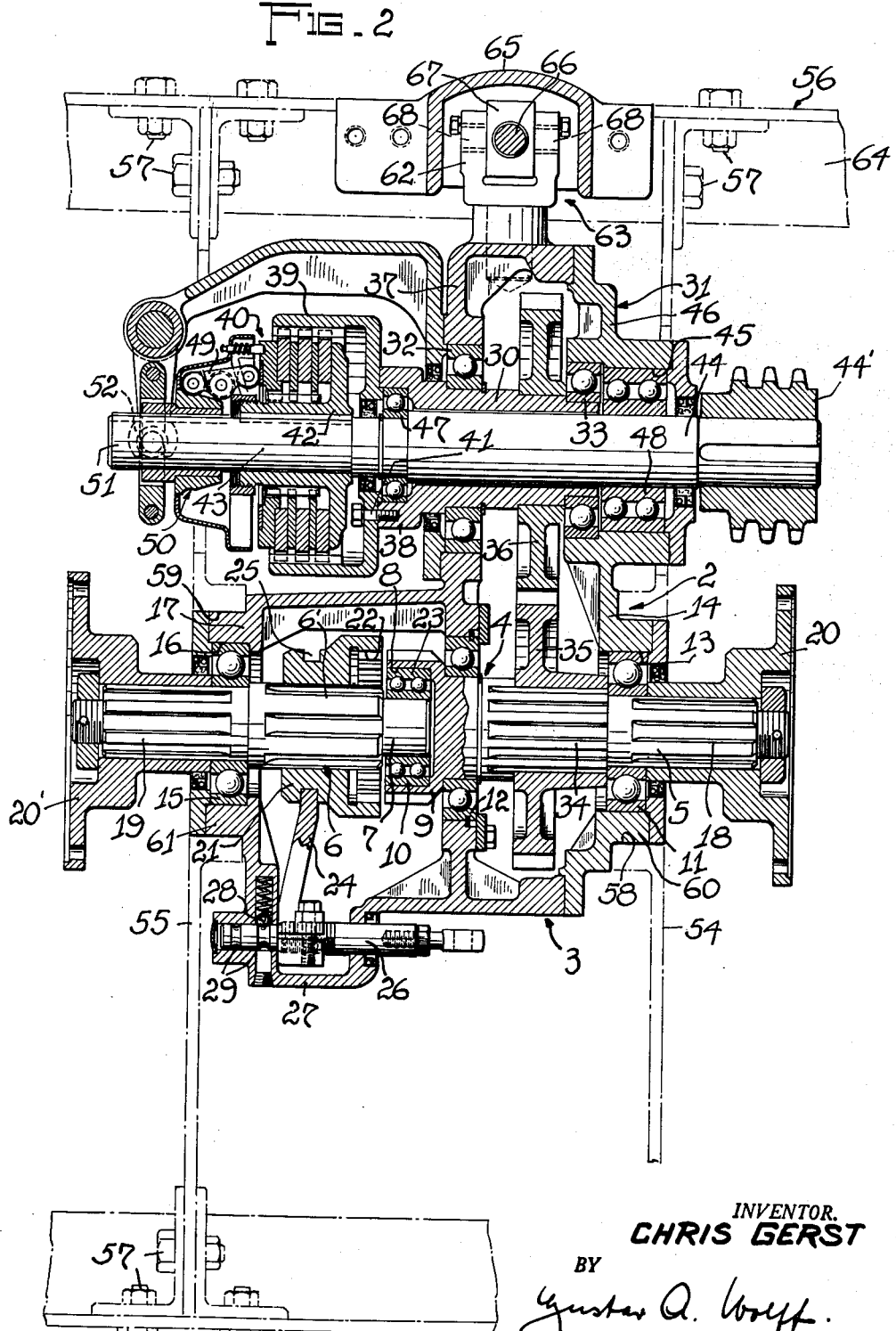

Patented June 10, 1952

2,600,108

UNITED STATES PATENT OFFICE 2,600,108

POWER TAKEOFF

Chris Gerst, Detroit, Mich., assignor to The Transmission & Gear Company, Dearborn, Mich., a corporation of Michigan Application January 12, 1950, Serial No. 138,109

1 Claim. (Cl. 74—15.8)

This invention relates in general to a power take-off for self-propelled vehicles in which the engine of the vehicle furnishes the power to drive other devices, as, for example, the mixing drum of a truck mixer, an air compressor, a light plant, etc. This type of power take-off generally embodies a split shaft coupled with the forward and rear sections of the split drive shaft of a vehicle and a driven power take-off shaft coupled either by means of a chain drive or in any other feasible manner with the device to be driven, all as described in the Patent No. 2,316,130, dated April 6, 1943, of which I am a co-inventor. In this patent the coupling of the power take-off shaft with the driving portion of the split shaft is arranged in the housing of the power take-off, an arrangement complicating assembly and disassembly proceedings and making minor adjustments and repair of the clutch structure practically impossible without dismantling and disassembling the power take-off.

The primary object of the present invention is the provision of a power take-off constructed to include a split shaft, a directly driven, tubular countershaft extended at one end outside of the housing of said power take-off and a clutch controlled power take-off shaft axially aligned with and extended through the countershaft and housing, all for the purpose of permitting mounting of the clutch structure for the power take-off shaft outside of the housing adjacent to one side wall thereof.

Another object of the invention is the provision of a simplified power take-off of the type described above which is compact and sturdy, can readily adjustably be mounted on the frame of a vehicle and permits driving of either the vehicle or an auxiliary equipment or both the vehicle and the auxiliary equipment.

In addition, the invention has certain other marked superiorities which clearly distinguish it from presently known structures. These improvements or superiorities embodying certain novel features of construction are clearly set forth in the following specification and the appended claims, and a preferred form of embodiment of the invention is hereinafter shown with reference to the accompanying drawings forming part of the specification.

In the drawings:

Fig. 1 is a side view of a power take-off constructed in accordance with the invention; and Fig. 2 is a sectional view through the power take-off, the section being taken on line 2—2 of Fig. 1.

Referring now in detail to the exemplified form of the invention shown in the drawings, reference numeral 2 denotes a housing of L-shaped outline having mounted in its wider portion 3 a split shaft 4 embodying a drive section 5 and a driven section 6. Sections 5 and 6 are axially aligned with respect to each other and arranged adjacent to each other, and section 6 extends with its inner reduced end 7 into an axial bore 8 of the enlarged end portion 9 of drive section 5, a ball bearing 10 being used to freely rotatably mount end 7 in bore 8. The drive section 5 is rotatably mounted in housing 2 by ball bearings 11 and 12 and extends outwardly from housing 2 through a flanged opening 13 in the side wall 14 and the driven section 6 is rotatably mounted in ball bearing 19 and ball bearing 15 and extends outwardly from housing 2 through a flanged opening 16 in the side wall 17 opposite to side wall 14. Drive section 5 and driven section 6 carry on their exposed ends 18 and 19 suitable coupling members 20 and 20', respectively, to properly couple these sections with the split drive shaft of a vehicle, all as generally practiced and, therefore, not shown.

The driven section 6 mounts on its splined portion 6' a shiftable clutch member 21 provided with a toothed bore 22 which clutch member when sleeved upon the enlarged end portion 9 of drive section 5 engages the teeth 23 of said end portion and effects coupling of driven section 6 with drive section 5. Shifting of this clutch member 21 into clutching or releasing action is effected by a fork-shaped member 24 engaged with a circular groove 25 of said clutch member. This fork-shaped member is mounted on a shifting rod 26 slidably supported in an extension 27 of housing 2 and yieldingly held in predetermined positions by a spring pressed ball 28 when engaged with either one of two circular grooves 29 on said shifting rod.

The drive section 5 is directly coupled with a tubular shaft 30 journaled in the narrower portion 31 of housing 2 by means of ball bearings 32 and 33. For such purpose drive section 5 has mounted on its splined portion 34 a gear 35 meshing a gear 36 mounted on tubular shaft 30 which extends with one end through the side wall 37 of the narrower portion 31 of housing 2 and supports on its extended portion 38 a cup-shaped clutch member 39 of a friction clutch structure 40, bolts 41 being used to rigidly attach clutch member 39 to portion 38. The friction clutch structure 40 includes a second clutch member 42 which is keyed to the outwardly exposed end 43 of a power take-off shaft 44 journaled in tubular shaft 30 and a flanged opening 45 of side wall 46 of portion 31 by ball bearings 47 and 48, respectively. Power take-off shaft 44 mounts a sprocket wheel 44' for drive connection with the device to be driven.

The friction clutch structure 40 is positioned entirely outside of housing 2 adjacent to its side wall 37 and actuated upon by a dual lever member 49 adapted to be tilted to operative position by a shiftable cone member 50. This cone member, which is slidably supported on the end portion 51 of power take-off shaft 44 is shifted by a pivotally supported fork-shaped member 52 coupled with said cone member. When actuated by a lever arm 53, fork-shaped member 52 effects shifting of the cone member and therewith tilting of lever member 49 so as to actuate friction clutch structure 40.

The described power take-off when mounted on a vehicle, such as for example a truck, is supported between two transversely extending plates; to wit: a front plate 54 and a rear plate 55—which plates are vertically disposed and secured to the frame 56 of the truck by bolts 57. Plates 54 and 55 include flanged circular openings 58 and 59 rotatably supporting housing 2 on circular flanges 60 and 61 encircling openings 13 and 16 in side walls 14 and 17. Such rotatable support of housing 2 in plates 54 and 55 provides a means for substantially vertically adjusting the position of power take-off shaft 44 and permitting its direct coupling with gearing of the device to be driven or tensioning of a chain drive connection between power take-off shaft and the device to be driven. To effect such substantially vertical adjustment of the housing of the power take-off and hold it in adjusted position, housing 2 is provided with a yoke member 62 which cooperates with an adjusting device 63 attached to side rail 64 of frame 56. This adjusting device embodies a housing 65 having rotatably mounted therein a vertically disposed screw member 66 and including a collar member 67 which is threadedly engaged with the screw member 66. Collar member 67 is formed with trunnions 68 in turn engaged with yoke member 62 so that rotation of screw member 66 rotates housing 2 in openings 58 and 59 of plates 54 and 55 and thereby effects a substantially vertical adjustment of the power take-off shaft 44.

The described power take-off when attached to a truck frame structure in the manner described for quick and easy vertical adjustment of the position of power take-off shaft 44, permits individual or joint operation of the trucks and the device to be driven by single or joint actuation of the two clutches, the gear type clutch and the friction type clutch.

Having thus described my invention, what I claim is:

A power take-off unit embodying a substantially L-shaped housing having its elongated portion formed as a gear chamber and including a lateral extension formed as a clutch chamber, a split shaft arrangement extended through said gear chamber and clutch chamber and journaled in flanged portions of parallel outside walls of said chambers, said split shaft arrangement including a drive shaft section, a driven shaft section aligned with said drive shaft section and tubular coupling means axially shiftably, nonrotatably mounted on the driven shaft section and adapted to directly couple the shaft sections with each other, a tubular countershaft arranged parallel to the split shaft arrangement and journaled in opposite walls of the gear chamber, continuously meshing gears on the drive shaft section and the tubular countershaft, connecting the drive section to the countershaft, a power take-off shaft journaled in the tubular countershaft and extended through opposed walls of the gear chamber, and a friction clutch arranged outside of said housing and mounted on the outwardly exposed end of the countershaft adjacent to the clutch chamber, said friction clutch adapted to selectively frictionally couple the countershaft with the power take-off shaft.

CHRIS GERST.

REFERENCES CITED

The following references are of record in the file of this patent:

UNITED STATES PATENTS

| Number | Name | Date |
|---|---|---|
| 1,253,670 | Church | Jan. 15, 1918 |
| 1,827,655 | Haubert | Oct. 13, 1931 |
| 2,107,072 | Herrington | Feb. 1, 1938 |
| 2,232,992 | Alexander | Feb. 25, 1941 |
| 2,438,539 | Cook | Mar. 30, 1948 |
| 2,443,313 | Gerst | June 15, 1948 |
| 2,448,662 | Dale | Sept. 7, 1948 |
| 2,468,008 | Yocum | Apr. 19, 1949 |
| 2,536,737 | Gerst | Jan. 2, 1951 |

FOREIGN PATENTS

| Number | Country | Date |
|---|---|---|
| 501,498 | Great Britain | Feb. 28, 1939 |